US012571448B1

(12) United States Patent
    Barrasso et al.

(10) Patent No.: US 12,571,448 B1
(45) Date of Patent: *Mar. 10, 2026

(54) ISOLATOR DEVICE

(71) Applicant: Jonathan Manufacturing Corporation, Irvine, CA (US)

(72) Inventors: Massimo Barrasso, Upper Brookville, NY (US); Eric Raymond Jansson, Oakdale, NY (US)

(73) Assignee: Jonathan Manufacturing Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,452

(22) Filed: May 29, 2024

Related U.S. Application Data

(60) Provisional application No. 63/504,894, filed on May 30, 2023.

(51) Int. Cl.
    *F16F 7/104* (2006.01)
    *F16F 7/00* (2006.01)
(52) U.S. Cl.
    CPC .......... *F16F 7/104* (2013.01); *F16F 2222/08* (2013.01)
(58) Field of Classification Search
    CPC .......... F16F 2222/08; F16F 7/116; F16F 1/16
    USPC .......................................... 267/287; 248/570
    See application file for complete search history.

(56) References Cited

U.S. PATENT DOCUMENTS

| | | | | | |
|---|---|---|---|---|---|
| 5,169,110 | A | * | 12/1992 | Snaith | F16F 7/14 267/148 |
| 5,441,243 | A | * | 8/1995 | Loziuk | F16L 3/2056 267/136 |
| 8,613,431 | B1 | * | 12/2013 | Deloy | F16F 7/14 267/148 |

FOREIGN PATENT DOCUMENTS

| | | | | | | |
|---|---|---|---|---|---|---|
| JP | 02089828 | A | * | 3/1990 | | |
| RU | 2185542 | C2 | * | 7/2002 | | |
| RU | 2185548 | C2 | * | 7/2002 | | |
| WO | WO-9602770 | A1 | * | 2/1996 | | F16F 7/14 |
| WO | WO-2014195575 | A1 | * | 12/2014 | | F16F 15/067 |

OTHER PUBLICATIONS

Design Data Sheet for M18 Series Isolator, available at least prior to May 30, 2022. (Exhibit A).

(Continued)

*Primary Examiner* — Melody M Burch
(74) *Attorney, Agent, or Firm* — Knobbe, Martens, Olson & Bear, LLP

(57) ABSTRACT

Isolator devices to isolate equipment from vibration and/or shock. The isolator devices may include a helical coil with circumferentially distributed bars disposed thereon. The bars may include a first bar that couples to equipment to be isolated from vibration and/or shock, a second bar that couples to a support surface that experiences vibration and/or shock, and intermediary bars. The intermediary bars may be disposed circumferentially between the first and second bars to add increased stiffness to the helical coil.

20 Claims, 9 Drawing Sheets

(56)     References Cited

OTHER PUBLICATIONS

Design Data Sheet for SB32 Series Isolator, available at least prior to May 30, 2022. (Exhibit B).
MIL-DTL-901E, Detailed Specification, Shock Test, H.I. (High-Impact) Shipboard Machinery, Equipment, and Systems for United States Department of Defense, dated Jun. 20, 2017. (Exhibit C).
Invoice for Isolator Device Prototypes, dated Jul. 26, 2021. (Exhibit E).
Invoice for Isolator Device Prototypes, dated Feb. 11, 2022. (Exhibit F).

\* cited by examiner

200

300

100

400

Length 424  426
420
418
421
427
417
406
415  414
412
402
404
416
421
419
420
427
Width
424  426

400

411  408  410  416 404
402
405
406
412
Height
411
419
420
405
403
404
408  410

ISOLATOR DEVICE

CROSS REFERENCE TO RELATED APPLICATIONS

This application claims priority to U.S. Provisional Patent Application No. 63/504,894, filed May 30, 2023, which is incorporated herein by reference in its entirety. Any and all applications for which a foreign or domestic priority claim is identified in the Application Data Sheet of the present application is hereby incorporated by reference under 37 CFR 1.57.

BACKGROUND

Field

The present disclosure relates to isolator devices for isolating equipment from vibration and/or shock.

SUMMARY

Equipment, such as electronic equipment, may be sensitive to shock and/or vibration. Equipment may malfunction and/or fatigue at an accelerated rate when exposed to excessive shock and/or vibration. Vibration and/or shock may be a persistent issue when operating equipment in some fields (e.g., aerospace, naval, transportation, industrial, military and defense, energy, etc.).

Disclosed herein are isolator devices to isolate equipment from vibration and/or shock. The isolator devices can include a coil (e.g., helical coil). The coil may be formed from a cable, which may also be described as a rope or wire rope. The isolator devices can include first and second bars coupled to the coil. The turns of the coil may extend through the first and second bars. The first and second bars can be arranged such that the longitudinal axes thereof are parallel to a central longitudinal axis of the coil. The first and second bars can extend the entire length of the coil. The first and second bars may be positioned on opposing sides of the longitudinal axis of the coil. The first and second bars may be arranged one hundred and eighty degrees apart from each other about the central longitudinal axis of the coil.

The first bar can be coupled to equipment intended for shock and/or vibration isolation. The second bar can be coupled to a supporting surface that may experience vibration and/or shock such that the isolator device is disposed between the equipment and the supporting surface. The coil can isolate (e.g., reduce, greatly reduce) the vibration and/or shock passed from the supporting surface to the equipment, which may at least reduce malfunctions and/or fatigue resulting from vibration and/or shock. Isolation by the coil can refer to damping vibration and/or shock. For example, the coil can dampen vibration and/or shock experienced by the supporting surface that is passed to the equipment.

The isolator devices described herein may provide increased stiffness compared to prior devices, which may be desired in harsh conditions. For example, the isolator devices may include one or more intermediary bars coupled to the coil to provide increased stiffness. The turns of the coil may extend through the intermediary bars. The intermediary bars can be arranged such that the longitudinal axes thereof are parallel to a central longitudinal axis of the coil. The intermediary bars can extend the entire length of the coil. The intermediary bars can be disposed on the coil circumferentially between the first and second bars. For example, a first intermediary bar can be disposed on a first section of the coil between the first and second bars and a second intermediary bar can be disposed on a second section, different than the first section, between the first and second bars. The intermediary bars may be positioned on opposing sides of the longitudinal axis of the coil. The intermediary bars may be arranged one hundred and eighty degrees apart from each other about the central longitudinal axis of the coil. The intermediary bars may be arranged ninety degrees apart from each of the first and second bars about the central longitudinal axis of the coil. The first bar, second bar, first intermediary bar, and second intermediary bar may be distributed at ninety degree intervals about the central longitudinal axis of the coil. With the intermediary bars, the isolator devices described herein can provide at least about a 30% increase in stiffness under a compressive load, 15% increase in stiffness under a roll load, and/or over a 100% increase in stiffness under a shear load compared to isolator devices without the intermediary bars. In some variants, the inclusion of one or more intermediary bars may result in increases in stiffness that are greater than or lesser than the foregoing values.

In some variants, an isolator device that can isolate equipment from vibration and/or shock experienced by a support surface is disclosed herein. The isolator device can include a coil having a central longitudinal axis. The isolator device can include a first bar and a second bar. The first bar can be coupled to equipment. The second bar can be coupled to the support surface. The isolator device can include a first intermediary bar and a second intermediary bar. Each of the first bar, the second bar, the first intermediary bar, and the second intermediary bar can be coupled to the coil and parallel to the central longitudinal axis. Each of the first intermediary bar and the second intermediary bar can be circumferentially disposed between the first bar and the second bar about the central longitudinal axis.

In some variants, the first bar and the second bar can be disposed one hundred and eighty degrees apart from each other about the central longitudinal axis.

In some variants, the first intermediary bar and the second intermediary bar can be disposed one hundred and eighty degrees apart from each other about the central longitudinal axis.

In some variants, the first bar, the second bar, the first intermediary bar, and the second intermediary bar can be circumferentially distributed around the central longitudinal axis.

In some variants, the first bar, the second bar, the first intermediary bar, and the second intermediary bar can be circumferentially distributed about the central longitudinal axis at ninety degree intervals.

In some variants, the first bar and the second bar can each include holes through which turns of the coil pass through.

In some variants, the isolator device can include a spacer coupled to the first bar. The spacer can be disposed between the first bar and the equipment such that the first bar is indirectly coupled to the equipment by way of the spacer.

In some variants, the first intermediary bar and the second intermediary bar can each include holes through which turns of the coil pass through.

In some variants, the first bar and the second bar can be clamped around the coil.

In some variants, the first intermediary bar and the second intermediary bar can each comprise a length that is less than lengths of the first bar and the second bar.

In some variants, the first intermediary bar and the second intermediary bar can be clamped around the coil.

In some variants, the first bar and the second bar each can include a first portion and a second portion. The first portion can be disposed outside the coil and the second portion can be disposed inside the coil.

In some variants, the first portion and the second portion each can include corresponding channels. The corresponding channels of the first portion and the second portion can cooperate to form a hole through which a turn of the coil may pass.

In some variants, the first intermediary bar and the second intermediary bar can each include a first portion and a second portion. The first portion can be disposed outside the coil and the second portion can be disposed inside the coil.

In some variants, the first portion and the second portion can each include corresponding channels. The corresponding channels of the first portion and the second portion can cooperate to form a hole through which a turn of the coil may pass.

In some variants, the first portion and the second portion can be coupled together with a plurality of screws.

In some variants, the coil can be a helical coil.

In some variants, the coil can include a wire rope.

In some variants, an isolator device that can isolate equipment from vibration and/or shock experienced by a support surface is disclosed herein. The isolator device can include a helical coil. The helical coil can include a wire rope disposed around a central longitudinal axis. The isolator device can include a first bar and a second bar. The first bar can be coupled to equipment. The second bar can be coupled to the support surface. The isolator device can include a first intermediary bar and a second intermediary bar. Each of the first bar, the second bar, the first intermediary bar, and the second intermediary bar can include first portions outside the helical coil and second portions inside the helical coil coupled together to clamp onto the coil. The first bar, the second bar, the first intermediary bar, and the second intermediary bar can be circumferentially distributed about the central longitudinal axis with the first intermediary bar and the second intermediary bar disposed between the first bar and the second bar.

In some variants, longitudinal axes of the first bar, the second bar, the first intermediary bar, and the second intermediary bar can be parallel to the central longitudinal axis.

In some variants, the first bar, the second bar, the first intermediary bar, and the second intermediary bar can be circumferentially distributed about the central longitudinal axis at ninety degree intervals with the first intermediary bar disposed between the first bar and the second bar and the second intermediary bar disposed between the first bar and the second bar.

In some variants, an isolator device to isolate equipment from vibration and/or shock experienced by a support surface is disclosed herein. The isolator device can include a helical coil. The helical coil can include a wire rope disposed around a central longitudinal axis. The isolator device can include a first bar and a second bar. The first bar can be coupled to equipment and the second bar can be coupled to the support surface. The isolator device can include a first intermediary bar and a second intermediary bar. Each of the first bar, the second bar, the first intermediary bar, and the second intermediary bar can include first portions outside the helical coil and second portions inside the helical coil coupled together to clamp onto the coil. The first bar and the second bar can be disposed one hundred and eighty degrees apart from each other about the central longitudinal axis. The first intermediary bar and the second intermediary bar can be disposed one hundred and eighty degrees apart from each other about the central longitudinal axis. The first bar and the second bar can be disposed circumferentially between the first intermediary bar and the second intermediary bar.

Any feature, structure, or step disclosed herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No individual aspects of this disclosure are essential or indispensable.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

DETAILED DESCRIPTION

The isolator devices described herein can isolate objects, such as sensitive equipment (e.g., electronics), from vibration and/or shock. The isolator devices may be used in a variety of applications, which can at least include aerospace, naval, transportation, industrial, military and defense, energy, and/or others in which it may be desirable to isolate equipment from vibration and/or shock (e.g., dampen vibration and/or shock).

Figure 1:
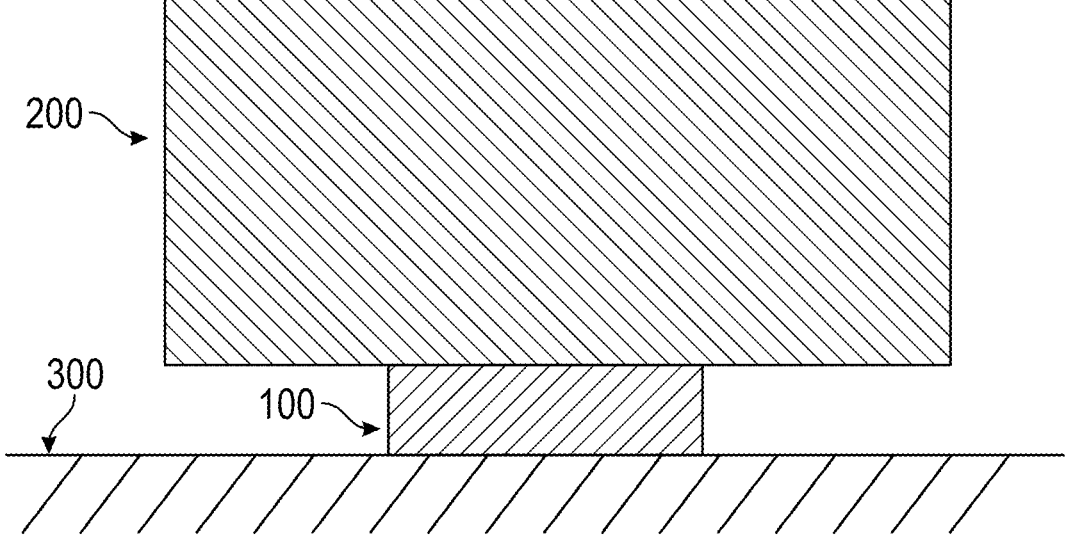
FIG. 1 schematically illustrates an isolator device disposed between an object, such as electronic equipment, and a supporting surface.

As illustrated in FIG. 1, an isolator device 100, which may also be referred to as an isolator and/or isolator system, can be positioned between an object 200 and a support surface 300 that experiences vibration and/or shock. The isolator device 100 can significantly reduce (e.g., dampen) the vibration and/or shock that is passed to the object 200 from the support surface 300. In some variants, the object 200 may produce vibration and/or shock, and the isolator device 100 can significantly reduce the vibration and/or shock that is passed to the support surface 300 from the object 200.

Figure 2:
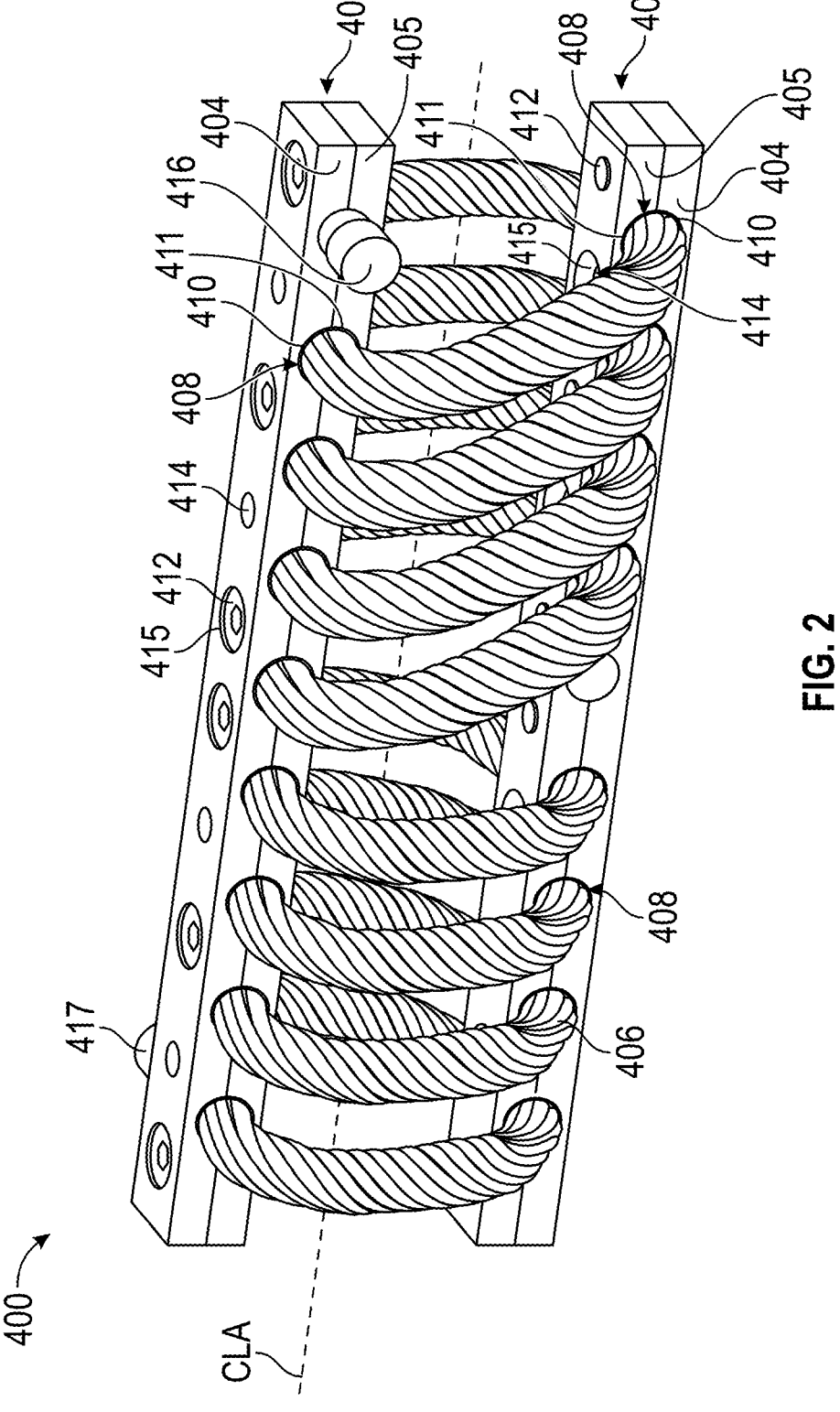
FIG. 2 illustrates an isolator device with two bars.

FIG. 2 illustrates a two-bar arrangement of an isolator device 400. The isolator device 400 can include a coil 406 (e.g., helical coil). The coil 406 may be made of a rope (e.g., wire rope) or cable. The coil 406 may be made of a variety of materials, which can at least include metal (steel, etc.), metal alloys (stainless steel), polymers, and/or other materials. The coil 406 may include a variety of overall diameters, pitch sizes, cable diameters, and/or overall lengths depending on the application of the isolator device 400. The coil 406 may include a variety of turns (e.g., 1, 2, 3, 4, 5, 6, 7, 8, 9, 10, or more) dependent on the application of the isolator device 400. The coil 406 may include a variety of coatings. The coil 406 can have a first end 416 and second end 417, which can each include a cap. The cap can be made of a variety of materials, which can at least include a polymer.

The isolator device 400 may include a first bar 402 and/or second bar 403, which may also be referred to as members or blocks. The first bar 402 and/or second bar 403 may have rectangular prism shapes. The first bar 402 and/or second bar 403 may be coupled to the coil 406. The first bar 402 and/or second bar 403 may help the coil 406 to hold its shape, which can include holding its shape when under loads. The first bar 402 and/or second bar 403 may facilitate coupling the isolator device 400 to objects 200, such as equipment, and/or support surfaces 300. The first bar 402 and/or second bar 403 may extend the length of the coil 406. The first bar 402 and/or second bar 403 may be circumferentially distributed about the coil 406. The first bar 402 and second bar 403 may be arranged with longitudinal axes thereof parallel to the central longitudinal axis CLA of the coil 406 (e.g., the axis about which the coil 406 is centered). The turns, which can include all of the turns, of the coil 406 may extend through the first bar 402 and second bar 403. The first bar 402 and second bar 403 can be positioned on opposing sides of the longitudinal axis of the coil 406. The first bar 402 and second bar 403 may be arranged one hundred and eighty degrees apart from each other about the central longitudinal axis CLA but other arrangements can be used (e.g., less than one hundred and eighty degrees apart).

Each of the first bar 402 and/or second bar 403 can include a first portion 404 and second portion 405. The first portions 404 and second portions 405 can be coupled together to form the first bar 402 and second bar 403. The first portion 404 and/or second portion 405 can be bars but can also be described as members or blocks. The first portion 404 and/or second portion 405 can include a rectangular prism shape. The first portion 404 and/or second portion 405 can each be half of the first bar 402 and second bar 403, although other arrangements can be used as well (e.g., first portion 404 can be 10%, 20%, 30%, 40%, 50%, 60%, 70%, 80%, or 90% of the first bar 402 or second bar 403 and the second portion 405 can be the remainder of the first bar 402 or second bar 403). The first bar 402 and second bar 403 can be coupled to the coil 406 by coupling the first portion 404 and second portion 405 together with the coil 406 passing between the first portion 404 and second portion 405 to clamp the coil 406. For example, the first portion 404 may be positioned outside the coil 406 and the second portion 405 can be positioned inside the coil 406 when coupled together. The first bar 402 and second bar 403 can include a plurality of holes 408 through which the coil 406 can pass through the first bar 402 and second bar 403. The holes 408 can be formed by first channels 410 (e.g., grooves) in the first portions 404 and second channels 411 (e.g., grooves) in the second portions 405. When the first portion 404 is coupled to the second portion 405, the first channels 410 can be aligned with the second channel 411 to define a plurality of holes 408. The holes 408 can be a variety of shapes, which can at least include circular, elliptical, and/or oval.

The first bar 402 and second bar 403 can include a plurality of holes 414, which can be threaded, extending through the first portions 404 and second portions 405 to facilitate coupling the first portions 404 and second portions 405 together with screws 412 to form the first bar 402 and second bar 403. The holes 414 can include enlarged portions 415 to receive the heads of the screws 412. In some variants, at least some of the holes 414 can be used to couple the first bar 402 and second bar 403 to the object 200 or support surface 300. The holes 414 can be disposed between the holes 408. The axes of the holes 414 and holes 408 can be arranged perpendicular relative to each other. The axes of the holes 414 can be arranged perpendicular to the central longitudinal axis CLA of the coil 406. The axes of the holes 414, if projected, can intersect with the central longitudinal axis CLA of the coil 406.

As illustrated in FIG. 2, the turns of the coil 406 can be arranged to balance the isolator device 400. Some portions (e.g., half coils, half turns) of the coil 406 can extend straight between the first bar 402 and the second bar 403, when viewed from the side, while other corresponding portions (e.g., half coils, half turns) of the coil 406 can extend at an angle between the first bar 402 and the second bar 403, when viewed from the side. For example, for about a first half of a length of the isolator device 400, the half coils (e.g., half turns of the coil 406) on a first lateral side of the isolator device 400 can extend at an angle between the first bar 402 and the second bar 403, when viewed from the side, and the corresponding half coils (e.g., half turns of the coil 406) on a second lateral side of the isolator device 400 opposite the first lateral side can extend straight, when viewed from the side, between the first bar 402 and the second bar 403. For about a second half of the length of the isolator device 400, the arrangement can be reversed—the half coils on the first lateral side of the isolator device 400 can extend straight, when viewed from the side, between the first bar 402 and the second bar 403 and the corresponding half coils on the second lateral side of the isolator device 400 can extend at an angle, when viewed from the side, between the first bar 402 and the second bar 403. For the half coils extending straight between the first bar 402 and the second bar 403, the ends of the half coils can extend through holes 408 of the first bar 402 and second bar 403 that are at a same longitudinal position along the length of the isolator device 400 (e.g., the axes of the holes 408 can be disposed on a common plane that is perpendicular to the central longitudinal axis CLA of the coil 406). For the half coils extending at an angle between the first bar 402 and the second bar 403, the ends of the half coils can extend through holes 408 of the first bar and second bar 403 that are at different longitudinal positions along the length of the isolator device 400 (e.g., the axes of the holes 408 can be parallel but offset in a longitudinal direction such that the axes of the holes 408 can be disposed in different planes that are perpendicular to the central longitudinal axis CLA of the coil 406). In some variants, the coil 406 can skip one or more holes 408 of the first bar 402 and/or second bar 403 to transition between angled and straight half coils. In some variations, the isolator device 400 can include a plurality of alternating sections that alternate the angled and straight half coil arrangements along a length of the isolator device 400.

The first bar 402 and/or second bar 403 can be made of a variety of materials, which can at least include metals (e.g., aluminum), metal alloys, polymers, ceramics, etc. The first bar 402 and second bar 403 can be the same size and/or shape as each other. The first bar 402 and second bar 403 can be different sizes and/or shapes from each other.

Figure 3A:
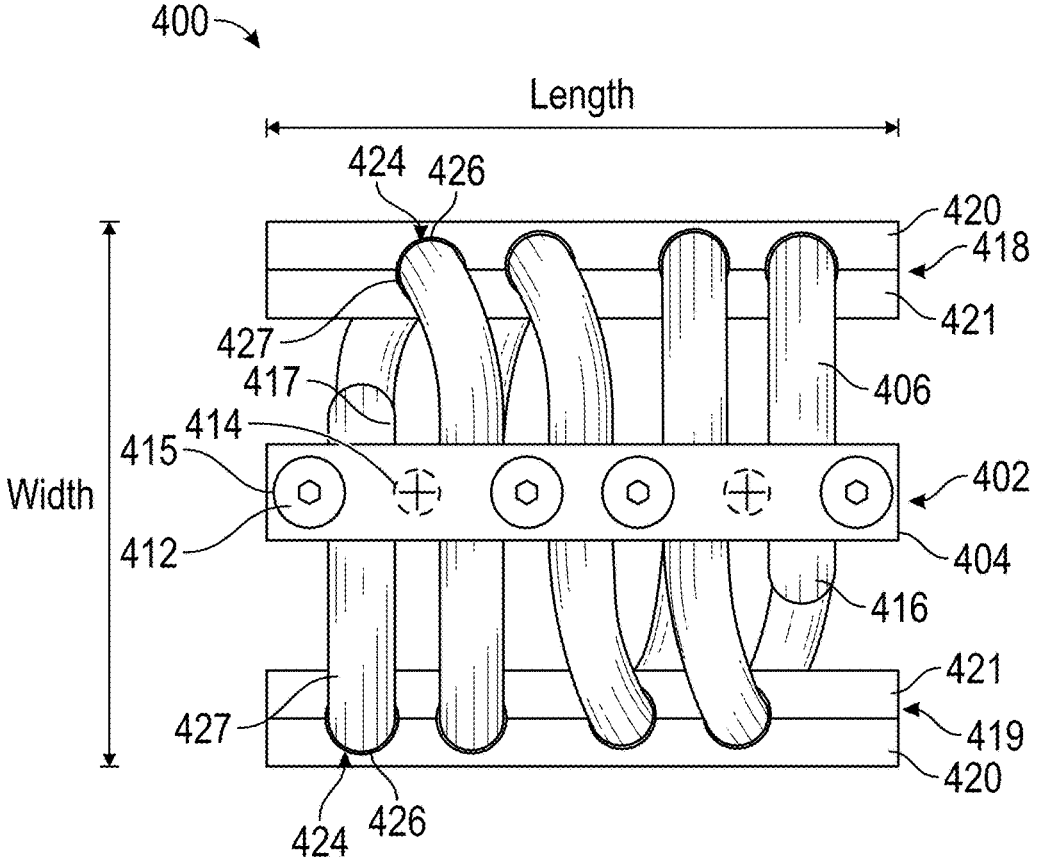
FIG. 3A illustrates a top view of the isolator device of FIG. 2 with two intermediary bars.
Figure 3B:
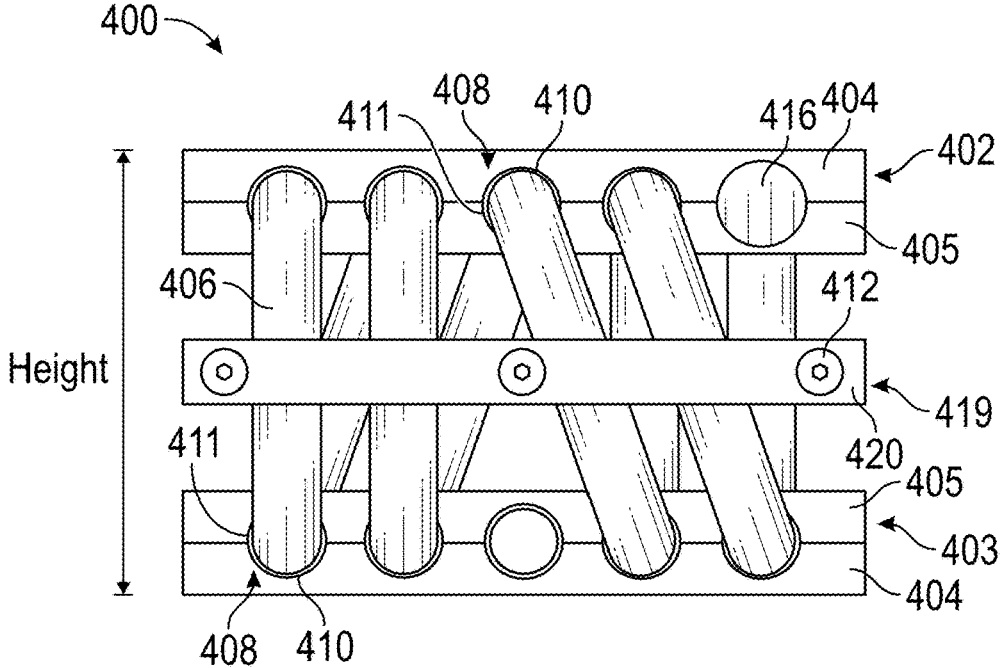
FIG. 3B illustrates a side view of the isolator device of FIG. 3A.
Figure 3C:
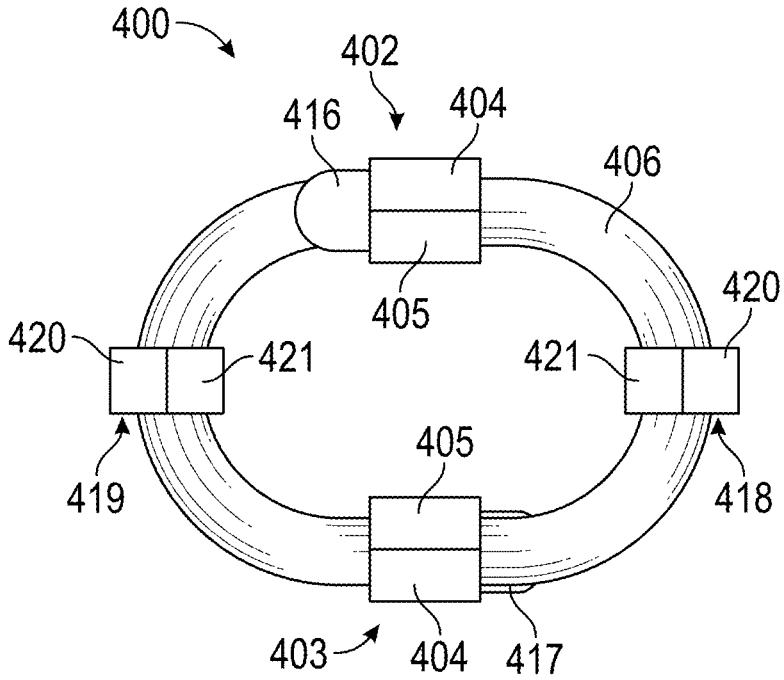
FIG. 3C illustrates a front view of the isolator device of FIG. 3B.

FIGS. 3A-3C illustrate various views of a four-bar arrangement of the isolator device 400. As illustrated in FIG. 3A, the isolator device 400 can include one or more intermediary bars coupled to the coil 406 and circumferentially disposed between the first bar 402 and second bar 403. The one or more intermediary bars can include a first intermediary bar 418 and/or a second intermediary bar 419, which may also be referred to as members or blocks. The first intermediary bar 418 and/or second intermediary bar 419 may have a rectangular prism shape. The first intermediary bar 418 and/or second intermediary bar 419 may be coupled to the coil 406. The first intermediary bar 418 and/or second intermediary bar 419 may help the coil 406 to further hold its shape and/or increase stiffness, which can include further holding its shape and/or increasing stiffness when under loads. The first intermediary bar 418 and/or second intermediary bar 419 may extend the length of the coil 406. In some variants, the first intermediary bar 418 and/or second intermediary bar 419 can include a length that is less than that of the coil 406, isolator device 400, first bar 402, and/or second bar 403. The first intermediary bar 418 and/or second intermediary bar 419 may be circumferentially distributed about the coil 406. The first intermediary bar 418 and/or second intermediary bar 419 may be arranged with longitudinal axes thereof parallel to the central longitudinal axis CLA of the coil 406. The turns, which can include all of the turns, of the coil 406 may extend through the first intermediary bar 418 and/or second intermediary bar 419. The first intermediary bar 418 and second intermediary bar 419 can be positioned on opposing sides of the central longitudinal axis CLA of the coil 406. The first intermediary bar 418 and second intermediary bar 419 may be arranged one hundred and eighty degrees apart from each other about the central longitudinal axis CLA but other degrees of separation can be used. The first bar 402, second bar 403, first intermediary bar 418, and second intermediary bar 419 can be distributed at ninety degree intervals about the central longitudinal axis of the coil but other intervals can be used. The first intermediary bar 418 and second intermediary bar 419 can be circumferentially disposed between the first bar 402 and the second bar 403 about the central longitudinal axis CLA.

Each of the first intermediary bar 418 and second intermediary bar 419 can include a first portion 420 and/or second portion 421. The first portions 420 and second portions 421 can be coupled together to form the first intermediary bar 418 and second intermediary bar 419. The first portions 420 and/or second portions 421 can be bars but can also be described as members or blocks. The first portions 420 and/or second portions 421 can include a rectangular prism shape. The first portion 420 and/or second portion 421 can each be half of the first intermediary bar 418 and/or second intermediary bar 419, although other arrangements can be used as well (e.g., first portion 420 can be 10%, 20%, 30%, 40%, 50%, 60%, 70%, 80%, or 90% of the first intermediary bar 418 or second intermediary bar 419 and the second portion 421 can be the remainder of the first intermediary bar 418 or second intermediary bar 419).

The first intermediary bar 418 and second intermediary bar 419 can be coupled to the coil 406 by coupling the first portion 420 and second portion 421 together with the coil 406 passing between the first portion 420 and second portion 421 to clamp the coil 406. For example, the first portion 420 may be positioned outside the coil 406 and the second portion 421 can be positioned inside the coil 406 when coupled together. The first intermediary bar 418 and/or second intermediary bar 419 can include a plurality of holes 424 through which the turns of the coil 406 can pass through the first intermediary bar 418 and second intermediary bar 419. The holes 424 can be formed by first channels 426 (e.g., grooves) in the first portions 420 and second channels 427 (e.g., grooves) in the second portions 421. When the first portion 420 is coupled to the second portion 421, the first channels 426 can be aligned with the second channel 427 to define the plurality of holes 424. The plurality of holes 424 can include different shapes, which can at least include circular, elliptical, and/or oval. An elliptical and/or oval shape can accommodate the cable as the cable is arranged in the coil shape on the isolator device 400. The axes of the holes 424 can be perpendicular relative to a central longitudinal axis of the first intermediary bar 418 and/or second intermediary bar 419. In some variants, at least some of the axes of the holes 424 can be oriented at angles other than perpendicular relative to a central longitudinal axis of the of the first intermediary bar 418 and second intermediary bar 419, which can accommodate angled half coils of the coil 406. The plurality of holes 424 can be distributed at various locations along the lengths of the first intermediary bar 418 and second intermediary bar 419 to receive the turns of the coil 406 therethrough, which can at least accommodate receiving the straight and angled half coils of the coil 406 described herein. In some variants, the plurality of holes 424 can be evenly distributed (e.g., equally spaced apart) along a length of the first intermediary bar 418 and second intermediary bar 419.

The first intermediary bar 418 and second intermediary bar 419 can include a plurality of holes, which can be threaded, extending through the first portions 420 and second portions 421 to facilitate coupling the first portions 420 and second portions 421 together with screws 412 to form the first intermediary bar 418 and second intermediary bar 419, as illustrated in FIG. 3B. The holes can include enlarged portions to house the heads of the screws 412. The first intermediary bar 418 and/or second intermediary bar 419 can each include different numbers of holes (e.g., three) to facilitate coupling the first portions 420 and second portions 421 together with screws 412 around the coil 406.

The first bar 402 and/or second bar 403 can be made of a variety of materials, which can at least include metals (e.g., aluminum), metal alloys, polymers, ceramics, etc. The first intermediary bar 418 and second intermediary bar 419 can be the same size and/or shape as each other. The first intermediary bar 418 and second intermediary bar 419 can be different sizes and/or shapes as each other. The first intermediary bar 418 and/or second intermediary bar 419 can be the same size and/or shape as the first bar 402 and/or second bar 403. The first intermediary bar 418 and/or second intermediary bar 419 can be different sizes and/or shapes as the first bar 402 and/or second bar 403. For example, the first intermediary bar 418 and/or second intermediary bar 419 can have smaller widths than the first bar 402 and/or second bar 403, as shown in FIG. 3C.

To assemble the isolator device 400, the second portion 405 of the first bar 402 may be positioned inside the coil 406 with the turns of the coil 406 seated in the second channels 411. The first portion 404 of the first bar 402 may be positioned outside the coil 406 with the first channels 410 aligned with the second channels 411 such that the turns of the coil 406 are positioned in the first channels 410 and the holes 408 are formed. The first portion 404 and second portion 405 can be coupled together to form the first bar 402 with the turns of the coil 406 clamped therebetween by threading screws 412 into at least some of the holes 414. Similarly, the second portion 405 of the second bar 403 may be positioned inside the coil 406 with the turns of the coil 406 seated in the second channels 411. The second portion 405 of the second bar 403 may be positioned one hundred and eighty degrees about the central longitudinal axis CLA from the second portion 405 of the first bar 402. The first portion 404 of the second bar 403 may be positioned outside the coil 406 with the first channels 410 aligned with the second channels 411 such that the turns of the coil 406 are positioned in the first channels 410 and the holes 408 are formed. The first portion 404 and second portion 405 can be coupled together to form the second bar 403 with the turns of the coil 406 clamped therebetween by threading screws 412 into at least some of the holes 414.

The second portion 421 of the first intermediary bar 418 may be positioned inside the coil 406 with the turns of the coil 406 seated in the second channels 427 with the second portion 421 disposed circumferentially between the second portions 405 of the first bar 402 and second bar 403. The second portion 421 of the first intermediary bar 418 may be positioned 90 degrees about the central longitudinal axis CLA from the second portions 405 of the first bar 402 and second bar 403. The first portion 420 of the first intermediary bar 418 may be positioned outside the coil 406 with the first channels 426 aligned with the second channels 427 such that the turns of the coil 406 are positioned in the first channels 426 and so that the holes 424 are formed. The first portion 420 and second portion 421 can be coupled together to form the first intermediary bar 418 with the turns of the coil 406 clamped therebetween by threading screws 412 through the holes of the first intermediary bar 418.

Similarly, the second portion 421 of the second intermediary bar 419 may be positioned inside the coil 406 with the turns of the coil 406 seated in the second channels 427 with the second portion 421 disposed circumferentially between the second portions 405 of the first bar 402 and second bar 403. The second portion 421 of the second intermediary bar 419 may be positioned 90 degrees about the central longitudinal axis CLA from the second portions 405 of the first bar 402 and second bar 403. The second portion 421 of the second intermediary bar 419 may be positioned one hundred and eighty degrees about the central longitudinal axis CLA from the second portion 421 of the first intermediary bar 418. The first portion 420 of the second intermediary bar 419 may be positioned outside the coil 406 with the first channels 426 aligned with the second channels 427 such that the turns of the coil 406 are positioned in the first channels 426 and so that the holes 424 are formed. The first portion 420 and second portion 421 can be coupled together to form the second intermediary bar 419 with the turns of the coil 406 clamped therebetween by threading screws 412 through the holes of the second intermediary bar 419.

Figures 4A, 4B:
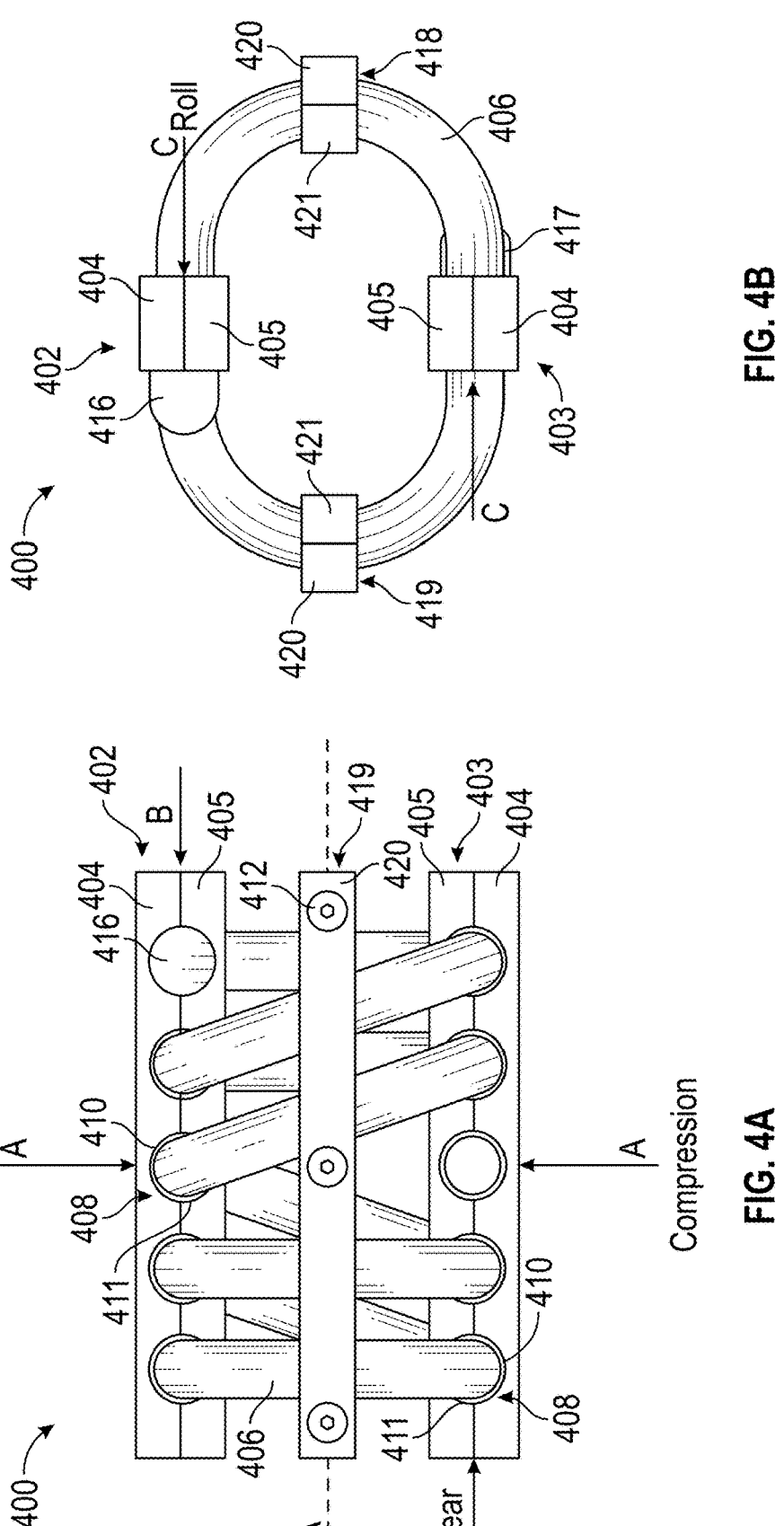
FIG. 4A illustrates example shear and compressive forces applied to the bars of the isolator device of FIG. 3A.
FIG. 4B illustrates example roll forces applied to the bars of the isolator device of FIG. 3A.

FIG. 4A illustrates example shear and compressive forces that can be applied to the first bar 402 and second bar 403 of the isolator device 400. As illustrated, compressive forces, represented by arrows A, can be applied perpendicularly to the outer longitudinal surfaces of the first bar 402 and second bar 403 toward the central longitudinal axis CLA of the isolator device 400, which can include toward the central longitudinal axis CLA from a perpendicular direction. As illustrated, shear forces, represented by arrows B, can be applied perpendicularly to one end of the first bar 402 and perpendicularly to an opposite end of the second bar 403. The shear forces can be applied in a direction parallel to the central longitudinal axis CLA.

FIG. 4B illustrates example roll forces that can be applied to the first bar 402 and second bar 403. As illustrated, roll forces, represented by arrows C, can be applied perpendicularly to opposing lateral longitudinal sides of the first bar 402 and second bar 403. For example, a first roll force can be applied perpendicularly to the lateral longitudinal side of the first bar 402 in a counterclockwise direction about the central longitudinal axis CLA and a second roll force can be applied perpendicularly to the lateral longitudinal side of the first portion 404 in a counterclockwise direction.

Figures 5A, 5B:
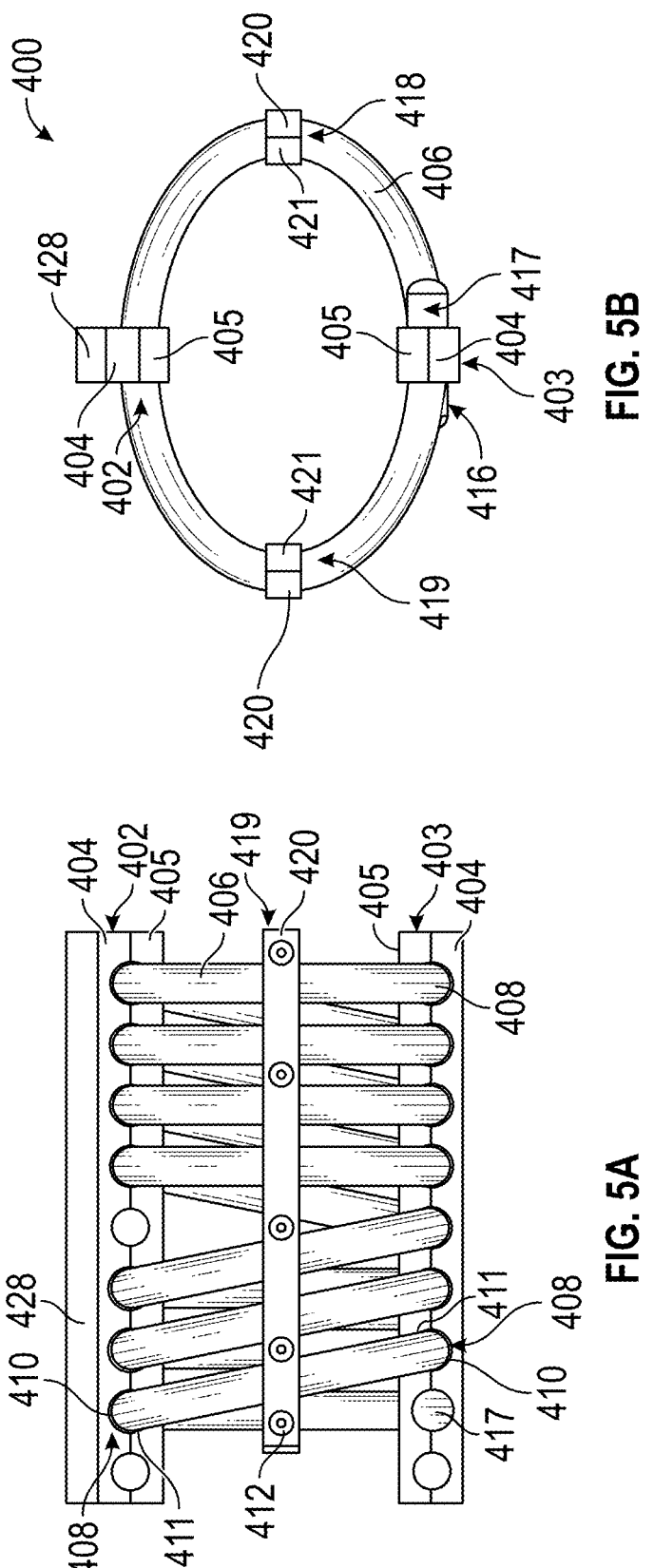
FIG. 5A illustrates an isolator device with shortened intermediary bars and a spacer bar.
FIG. 5B illustrates a front view of the isolator device of FIG. 5A.

The isolator device 400 can include a spacer 428, which can be a bar, member, and/or block, as illustrated in FIGS. 5A and 5B. The spacer 428 can space the first bar 402 away from an object 200. The spacer 428 can be disposed between the first bar 402 and the object 200, which can facilitate proper performance (e.g., damping) by the isolator device 400 during large compression strokes. For example, the spacer 428 can maintain the object 200 away from the coil 406 during large compression strokes. The spacer 428 can be coupled (e.g., fastened, bolted, adhered, welded, etc.) to the first bar 402 (e.g., outer lateral side of the first bar 402). In some variants, a spacer (e.g., bar, member, and/or block) can be used to space the second bar 403 away from a supporting surface 300.

The isolator device 400 can include a first intermediary bar 418 and/or second intermediary bar 419 that is shortened. For example, the first intermediary bar 418 and/or second intermediary bar 419 may, in some variants, not extend the entire length of the isolator device 400 (e.g., first bar 402 and/or second bar 403), which can avoid the first intermediary bar 418 and/or second intermediary bar 419 contacting (e.g., crashing into) other objects and/or isolator devices. The first intermediary bar 418 and/or second intermediary bar 419 can extend from one end of the isolator device 400 (e.g., proximate one end of the first bar 402 and/or second bar 403) to a position between the two ends of the isolator device 400 (e.g., two ends of the first bar 402 and/or second bar 403). The first intermediary bar 418 and/or second intermediary bar 419 can extend from a first position between the ends of the isolator device 400 (e.g., one end of the first bar 402 and/or second bar 403) to a second position between the ends of the isolator device 400 (e.g., one end of the first bar 402 and/or second bar 403). The first intermediary bar 418 and/or second intermediary bar 419 can be shorter than the first bar 402 and/or second bar 403.

Figure 6:
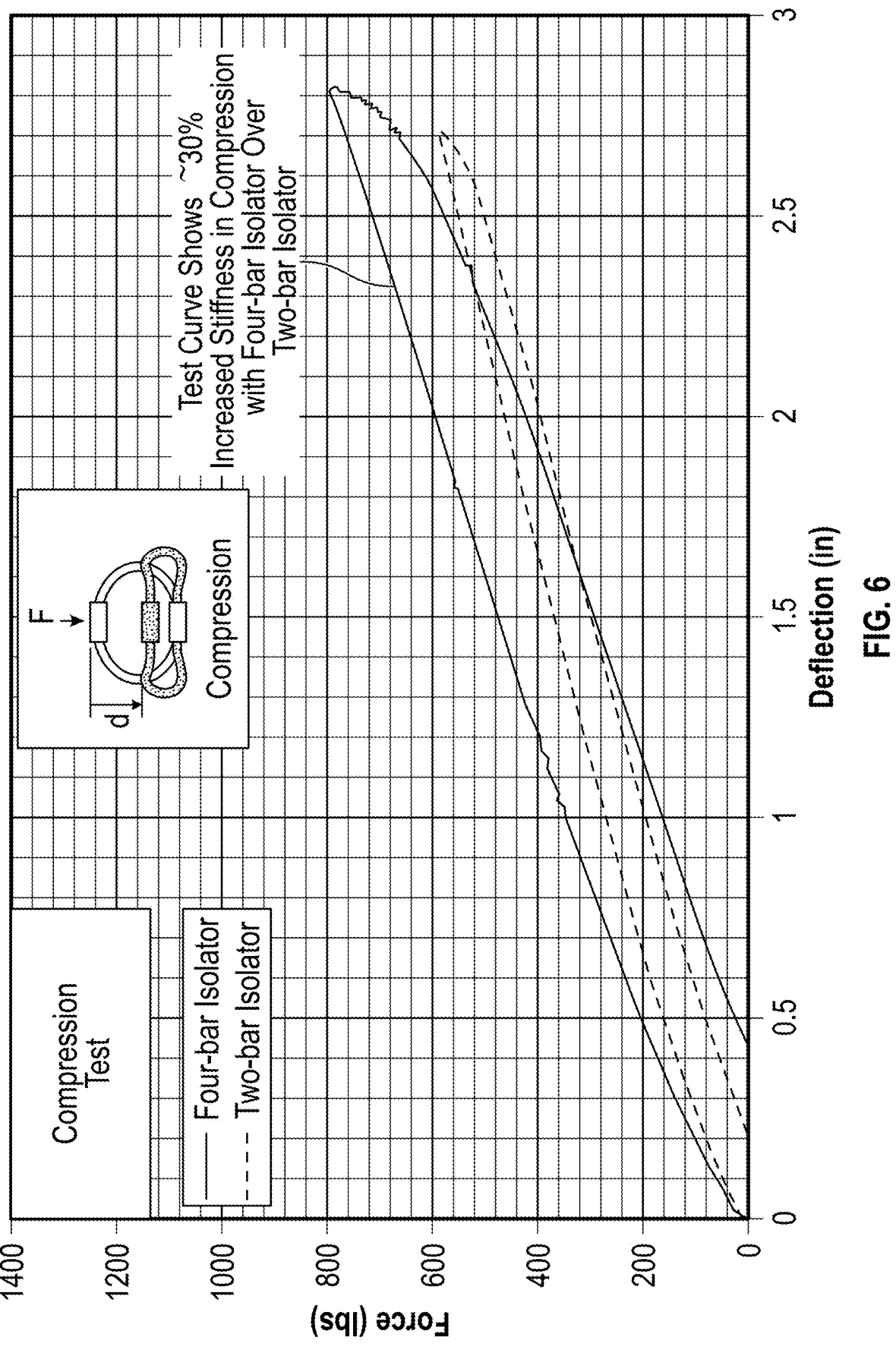
FIG. 6 illustrates a graph of the deflections of a two-bar arrangement and a four-bar arrangement of the isolator device when placed under a compressive load.

FIG. 6 illustrates a graph of testing results of the deflections of the two-bar arrangement and the four-bar arrangement (i.e., with the intermediary bars) of the isolator device 400 when placed under a compressive force. To perform the test for each of the two-bar and four-bar arrangements, the second bar 403 was secured in place and a load was applied perpendicularly to the outer surface of the first bar 402 toward the central longitudinal axis CLA of the isolator device 400. The results for the four-bar arrangement are shown in solid line and the results for the two-bar arrangement are shown in dashed line. The upper lines for the two-bar and four-bar isolator devices 400 correspond to the deflection (i.e., distance the first bar 402 moved toward the second bar 403 from unloaded configuration) as the applied compressive force increased from zero. The lower lines for the two-bar and four-bar isolator devices 400 correspond to the deflection as the applied force decreased back to zero. As shown, the compressive load tests demonstrated at least about a 30% increase in stiffness in compression for the isolator device 400 with the intermediary bars compared to the isolator device 400 without the intermediary bars. In some variants, the increase in stiffness under a compressive load can be 5%, 10%, 15%, 20%, 25%, 30%, 35%, 40%, 45%, 50%, 55%, 60%, 65%, 70%, 75%, 80%, 85%, 90%, 95%, 100%, or more or any value between the foregoing values.

Figure 7:
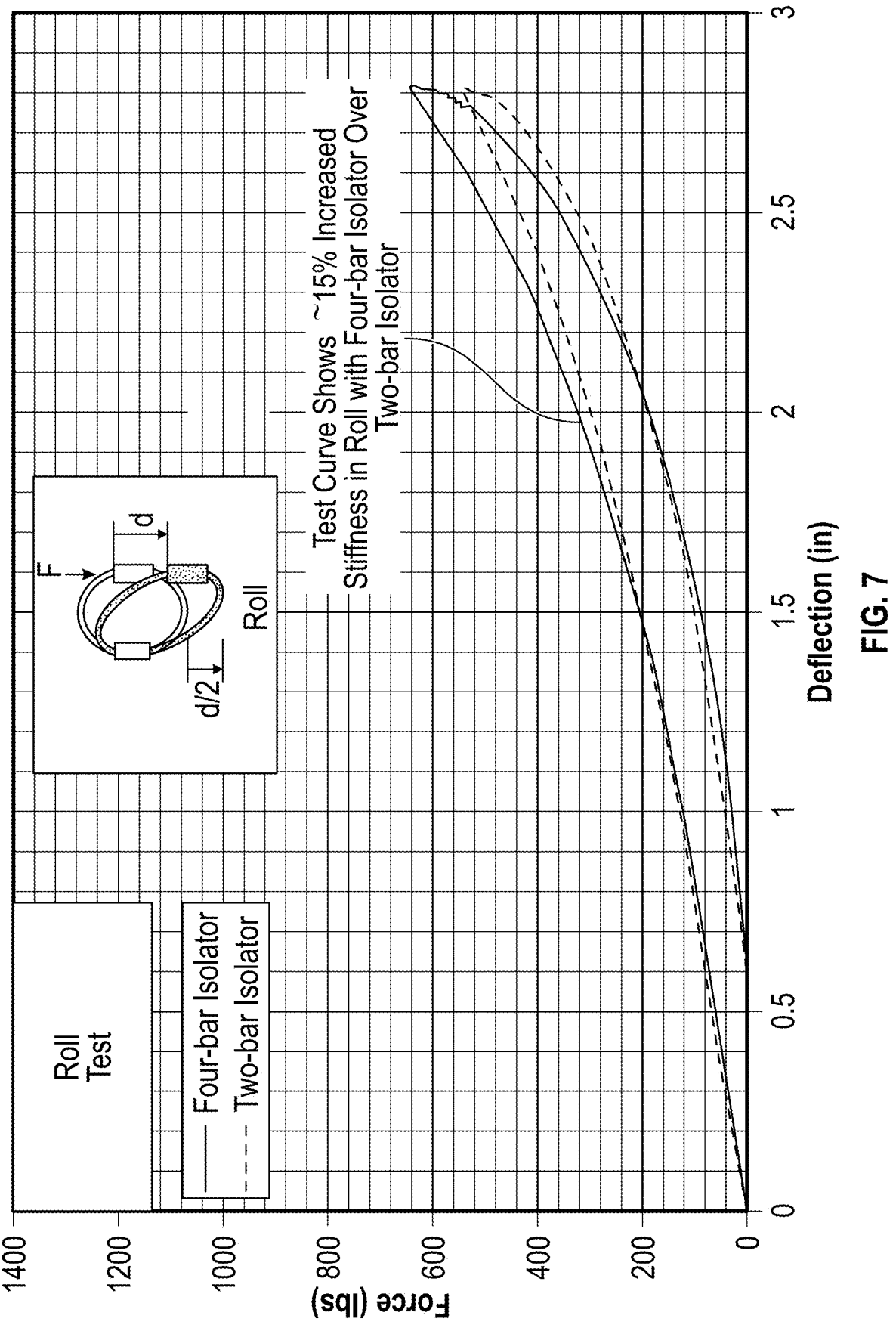
FIG. 7 illustrates a graph of the deflections of a two-bar arrangement and a four-bar arrangement of the isolator device when placed under a roll load.

FIG. 7 illustrates a graph of testing results of the deflections of the two-bar arrangement and the four-bar arrangement of the isolator device 400 when placed under a roll load. To perform the test for each of the two-bar and four-bar arrangements, the second bar 403 was secured in place and a load was applied perpendicularly to the lateral side of the first bar 402 in a counterclockwise direction. The results for the four-bar arrangement are shown in solid line and the results for the two-bar arrangement are shown in dashed line. The upper lines for the two-bar and four-bar isolator devices 400 correspond to the deflection (i.e., distance the first bar 402 moved from unloaded configuration) as the applied roll force increased from zero. The lower lines for the two-bar and four-bar isolator devices 400 correspond to the deflection as the applied force decreased back to zero. As shown, the roll load tests demonstrated at least about a 15% increase in stiffness under a roll force for the isolator device 400 with the intermediary bars compared to the isolator device 400 without the intermediary bars. In some variants, the increase in stiffness under a roll load can be 5%, 10%, 15%, 20%, 25%, 30%, 35%, 40%, 45%, 50%, 55%, 60%, 65%, 70%, 75%, 80%, 85%, 90%, 95%, 100%, or more or any value between the foregoing values.

Figure 8:
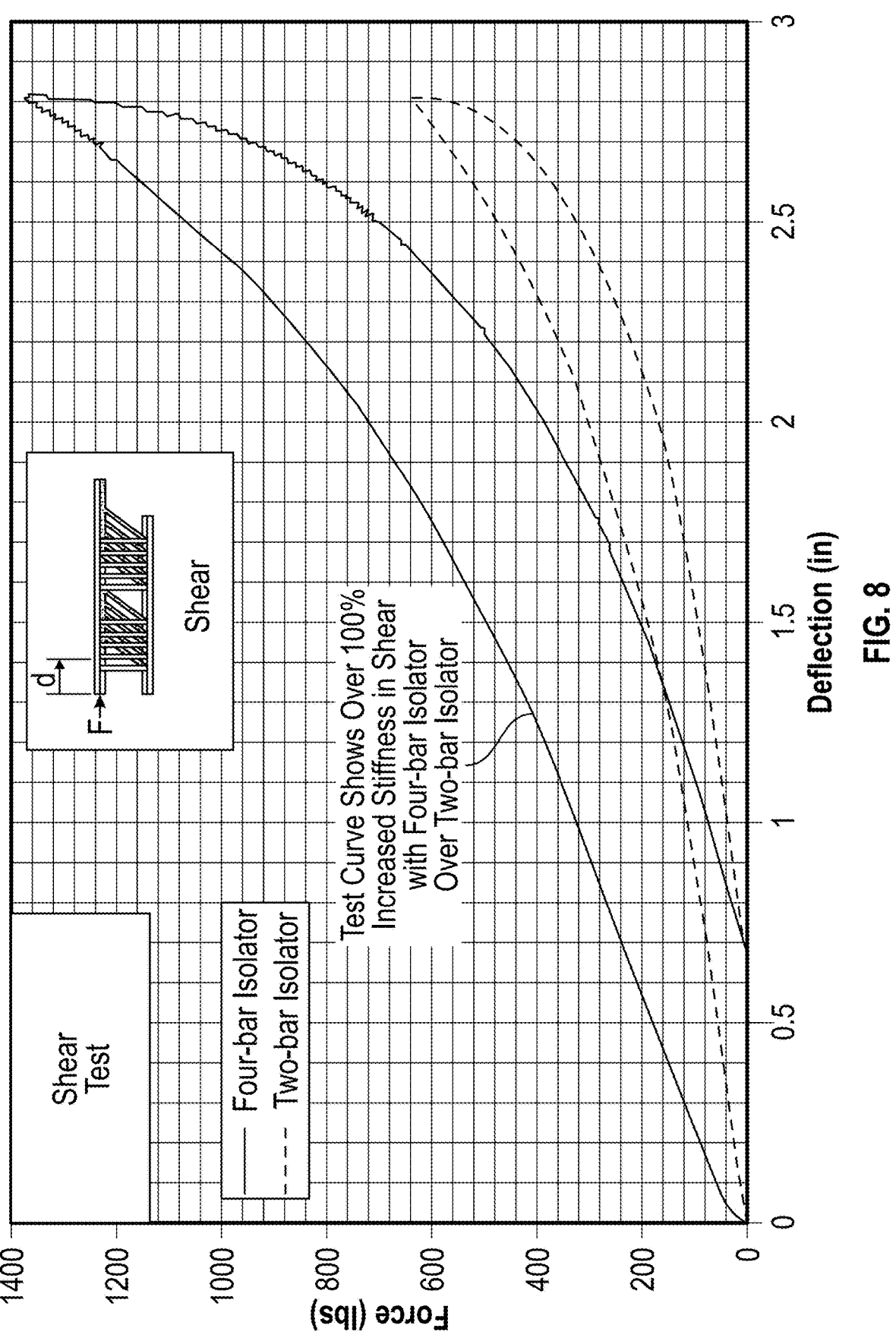
FIG. 8 illustrates a graph of the deflections of a two-bar arrangement and a four-bar arrangement of the isolator device when placed under a shear load.

FIG. 8 illustrates a graph of the testing results of the deflections of the two-bar arrangement and the four-bar arrangement of the isolator device 400 when placed under a shear load. To perform the test for each of the two-bar and four-bar arrangements, the second bar 403 was secured in place and a load was applied perpendicularly to the end of the first bar 402 in a direction parallel to the central longitudinal axis CLA. The results for the four-bar arrangement are shown in solid line and the results for the two-bar arrangement are shown in dashed line. The upper lines for the two-bar and four-bar isolator devices 400 correspond to the deflection (i.e., distance the first bar 402 moved from unloaded configuration) as the applied shear force increased from zero. The lower lines for the two-bar and four-bar isolator devices 400 correspond to the deflection as the applied force decreased back to zero. As shown, the shear load tests demonstrated over a 100% increase in stiffness under a shear force for the isolator device 400 with the intermediary bars compared to the isolator device 400 without the intermediary bars. In some variants, the increase in stiffness under a shear load can be 10%, 20%, 30%, 40%, 50%, 60%, 70%, 80%, 90%, 100%, 110%, 120%, 130%, 140%, 150%, 160%, 170%, 180%, 190%, 200%, or more or any value between the foregoing values.

The four-bar arrangement of the isolator device 400 with the intermediary bars can have greater stiffness under compressive, shear, and/or rolling loads. For example, the four-bar arrangement may meet military standard MIL-DTL-901E in one or more applications where the two-bar arrangement may not. A performance shortcoming of the two-bar arrangement of the isolator device 400 is the significant performance differences between the compression direction and the shear and/or roll directions. The four-bar arrangement greatly reduces the difference between the compression direction and the shear direction. This improvement allows for greater load capacity in the shear direction, which can be crucial to supplying sufficient load capacity in multiple directions when solving problems with space constraints. The four-bar arrangement for the isolator device 400 can be scaled down for smaller applications and scaled up for larger applications. The design of the first bar 402, second bar 403, first intermediary bar 418, and/or second intermediary bar 419 may vary for every isolator in a series and can be dependent on the number of turns, overall height, and/or overall width of the coil 406. The four-bar arrangement for the isolator devices described herein can operate in a wide temperature range, including at least-200 degrees Fahrenheit to 500 degrees Fahrenheit. The four-bar arrangement for the isolator devices described herein can have at least three axis capability. A plurality of the four-bar arrangement isolator devices can be disposed between an object and a supporting surface. In some variants, the isolator devices described herein can include 2, 4, 6, 8, 10, or more bars, which can include 2, 4, 6, 8, or more intermediary bars. The bars, which can include the intermediary bars, can be distributed (e.g., circumferentially distributed) around the coil of a cable.

Terminology

Although certain embodiments and examples have been described herein, it will be understood by those skilled in the art that many aspects of the devices shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example+1%, +5%, +10%, +15%, etc.). For example, "about 12 inches" includes "12 inches." Phrases preceded by a term such as "generally" include the recited phrase and should be interpreted based on the circumstances (e.g., as much as reasonably possible under the circumstances). For example, "generally parallel" includes "parallel."

What is claimed is:

1. An isolator device configured to isolate equipment from vibration and shock experienced by a support surface, the isolator device comprising:
 a coil comprising a central longitudinal axis;
 a first bar and a second bar, the first bar configured to be coupled to the equipment and the second bar configured to be coupled to the support surface such that the isolator device is disposed between the equipment and the support surface in a vertical direction to support a load of the equipment; and
 a first intermediary bar and a second intermediary bar, wherein widths of the first intermediary bar and the second intermediary bar are smaller than widths of the first bar and the second bar;
 wherein each of the first bar, the second bar, the first intermediary bar, and the second intermediary bar are coupled to the coil and parallel to the central longitudinal axis;
 wherein each of the first intermediary bar and the second intermediary bar are circumferentially disposed between the first bar and the second bar about the central longitudinal axis;
 wherein the first intermediary bar and the second intermediary bar each comprise a length that is less than lengths of the first bar and the second bar; and
 wherein the first intermediary bar and the second intermediary bar are positioned at one of two ends of the isolator device and extend to terminate between the two ends of the isolator device.

2. The isolator device of claim 1, wherein the first bar and the second bar are disposed one hundred and eighty degrees apart from each other about the central longitudinal axis.

3. The isolator device of claim 1, wherein the first intermediary bar and the second intermediary bar are disposed one hundred and eighty degrees apart from each other about the central longitudinal axis.

4. The isolator device of claim 1, wherein the first bar, the second bar, the first intermediary bar, and the second intermediary bar are circumferentially distributed around the central longitudinal axis.

5. The isolator device of claim 1, wherein the first bar, the second bar, the first intermediary bar, and the second intermediary bar are circumferentially distributed about the central longitudinal axis at ninety degree intervals.

6. The isolator device of claim 1, wherein the first intermediary bar and the second intermediary bar each comprise holes through which turns of the coil pass through.

7. The isolator device of claim 1, wherein the first intermediary bar and the second intermediary bar are clamped around the coil.

8. The isolator device of claim 1, wherein the first bar and the second bar each comprise a first portion and a second portion, the first portion disposed outside the coil and the second portion disposed inside the coil.

9. The isolator device of claim 8, wherein the first portion and the second portion each comprise corresponding channels, the corresponding channels of the first portion and the second portion cooperating to form a hole through which a turn of the coil may pass.

10. The isolator device of claim 1, wherein the first intermediary bar and the second intermediary bar each comprise a first portion and a second portion, the first portion disposed outside the coil and the second portion disposed inside the coil.

11. The isolator device of claim 10, wherein the first portion and the second portion each comprise corresponding channels, the corresponding channels of the first portion and the second portion cooperating to form a hole through which a turn of the coil may pass.

12. The isolator device of claim 10, wherein the first portion and the second portion are coupled together with a plurality of screws.

13. The isolator device of claim 1, wherein the coil is a helical coil.

14. The isolator device of claim 1, wherein the coil comprises a wire rope.

15. An isolator device configured to isolate equipment from vibration and shock, the isolator device comprising:
 a helical coil comprising a wire rope disposed around a central longitudinal axis;
 a first bar and a second bar, the first bar configured to support equipment and the second bar configured to be coupled to a support surface such that the isolator device is disposed between the equipment and the support surface in a vertical direction; and
 a first intermediary bar and a second intermediary bar, wherein each of the first intermediary bar and the second intermediary bar comprise holes through which the helical coil passes, wherein at least some of the holes are oriented at angles other than perpendicular relative to the central longitudinal axis;
 wherein each of the first bar, the second bar, the first intermediary bar, and the second intermediary bar comprise first portions outside the helical coil and second portions inside the helical coil coupled together to clamp onto the helical coil;
 wherein the first bar, the second bar, the first intermediary bar, and the second intermediary bar are circumferentially distributed about the central longitudinal axis with the first intermediary bar and the second intermediary bar disposed between the first bar and the second bar;
 wherein the first intermediary bar and the second intermediary bar each comprise a length that is less than lengths of the first bar and the second bar; and
 wherein the first intermediary bar and the second intermediary bar are positioned at one of two ends of the isolator device and extend to terminate between the two ends of the isolator device.

16. The isolator device of claim 15, wherein longitudinal axes of the first bar, the second bar, the first intermediary bar, and the second intermediary bar are parallel to the central longitudinal axis.

17. The isolator device of claim 15, wherein the first bar, the second bar, the first intermediary bar, and the second intermediary bar are circumferentially distributed about the central longitudinal axis at ninety degree intervals with the first intermediary bar disposed between the first bar and the second bar and the second intermediary bar disposed between the first bar and the second bar.

18. An isolator device configured to isolate equipment from vibration and shock, the isolator device comprising:

a helical coil comprising a wire rope disposed around a central longitudinal axis;

a first bar and a second bar, the first bar configured to be coupled to equipment and the second bar configured to be coupled to a support surface such that the isolator device is disposed between the equipment and the support surface in a vertical direction; and a first intermediary bar and a second intermediary bar, wherein widths of the first intermediary bar and the second intermediary bar are smaller than widths of the first bar and the second bar;

wherein each of the first bar, the second bar, the first intermediary bar, and the second intermediary bar comprise first portions outside the helical coil and second portions inside the helical coil coupled together to clamp onto the helical coil;

wherein the first intermediary bar comprises a first plurality of holes through which the wire rope of the helical coil passes, the first plurality of holes comprising a first pair of adjacent holes and a second pair of adjacent holes, wherein a distance between the first pair of adjacent holes of the first plurality of holes is different than a distance between the second pair of adjacent holes of the first plurality of holes;

wherein the second intermediary bar comprises a second plurality of holes through which the wire rope of the helical coil passes, the second plurality of holes comprising a first pair of adjacent holes and a second pair of adjacent holes, wherein a distance between the first pair of adjacent holes of the second plurality of holes is different than a distance between the second pair of adjacent holes of the second plurality of holes;

wherein at least some of the first plurality of holes and the second plurality of holes are oriented at angles other than perpendicular relative to the central longitudinal axis;

wherein the first bar and the second bar are disposed one hundred and eighty degrees apart from each other about the central longitudinal axis;

wherein the first intermediary bar and the second intermediary bar are disposed one hundred and eighty degrees apart from each other about the central longitudinal axis;

wherein the first bar and the second bar are disposed circumferentially between the first intermediary bar and the second intermediary bar; wherein the isolator device is configured to support a compressive load applied by the equipment to the isolator device that moves the first bar toward the second bar;

wherein the first intermediary bar and the second intermediary bar each comprise a length that is less than lengths of the first bar and the second bar; and wherein the first intermediary bar and the second intermediary bar are positioned at one of two ends of the isolator device and extend to terminate between the two ends of the isolator device.

19. The isolator device of claim 1, wherein:

the first intermediary bar comprises a first plurality of holes through which the coil passes, the first plurality of holes comprising a first pair of adjacent holes and a second pair of adjacent holes, wherein a distance between the first pair of adjacent holes of the first plurality of holes is different than a distance between the second pair of adjacent holes of the first plurality of holes; and the second intermediary bar comprises a second plurality of holes through which the coil passes, the second plurality of holes comprising a first pair of adjacent holes and a second pair of adjacent holes, wherein a distance between the first pair of adjacent holes of the second plurality of holes is different than a distance between the second pair of adjacent holes of the second plurality of holes.

20. The isolator device of claim 1, wherein each of the first intermediary bar and the second intermediary bar comprise holes through which the coil passes, wherein at least some of the holes are oriented at angles other than perpendicular relative to the central longitudinal axis.

\* \* \* \* \*